June 18, 1963 R. C. McDOWELL ETAL 3,094,577
MEANS FOR SEALING SPACE BETWEEN MOVING PALLETS
AND WINDBOXES OF SINTERING MACHINES
Filed Sept. 22, 1959 5 Sheets-Sheet 1

INVENTORS.
ROBERT C. McDOWELL
ROGER L. HULETTE
BY  CARL LUDWIG
ATTY

June 18, 1963  R. C. McDOWELL ETAL  3,094,577
MEANS FOR SEALING SPACE BETWEEN MOVING PALLETS
AND WINDBOXES OF SINTERING MACHINES
Filed Sept. 22, 1959  5 Sheets-Sheet 2

INVENTORS.
ROBERT C. McDOWELL
ROGER L. HULETTE
CARL LUDWIG
BY
Justin W. Macklin
ATT'Y June 18, 1963 R. C. McDOWELL ETAL 3,094,577
MEANS FOR SEALING SPACE BETWEEN MOVING PALLETS
AND WINDBOXES OF SINTERING MACHINES
Filed Sept. 22, 1959 5 Sheets-Sheet 3
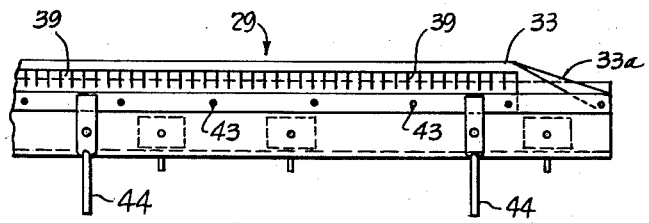
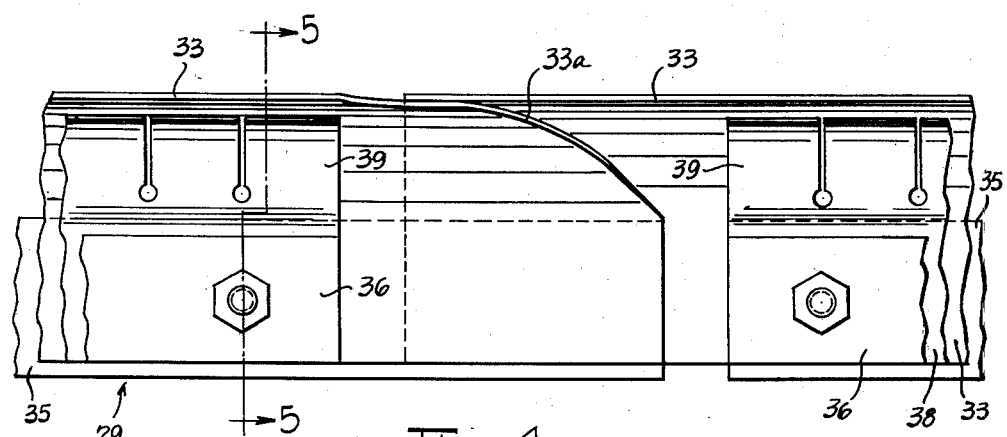
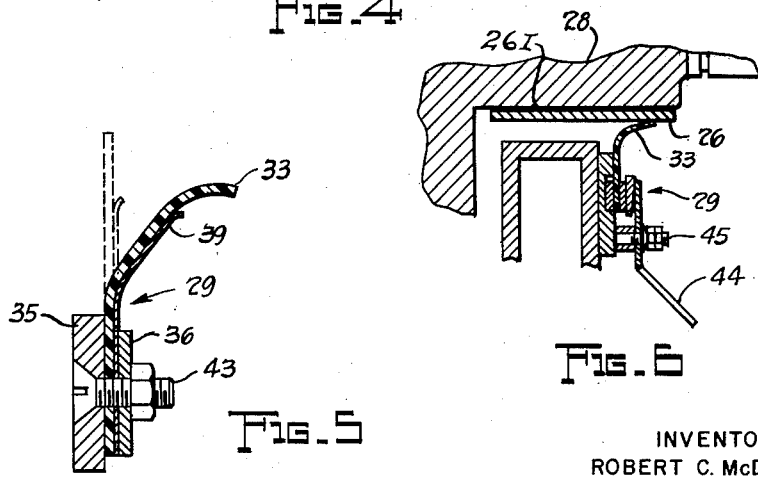
INVENTORS.
ROBERT C. McDOWELL
ROGER L. HULETTE
CARL LUDWIG
BY INVENTORS.
ROBERT C. McDOWELL
ROGER L. HULETTE
CARL LUDWIG.
BY Justin W. Macklin
ATTY June 18, 1963  R. C. McDOWELL ETAL  3,094,577
MEANS FOR SEALING SPACE BETWEEN MOVING PALLETS
AND WINDBOXES OF SINTERING MACHINES
Filed Sept. 22, 1959  5 Sheets-Sheet 5

INVENTORS.
ROBERT C. McDOWELL
ROGER L. HULETTE
CARL LUDWIG
BY
ATTY

United States Patent Office 3,094,577
Patented June 18, 1963

3,094,577
MEANS FOR SEALING SPACE BETWEEN MOVING PALLETS AND WINDBOXES OF SINTERING MACHINES
Robert C. McDowell, Lakewood, Roger L. Hulette, Berea, and Carl Ludwig, Cleveland, Ohio, assignors to McDowell Company, Inc., Cleveland, Ohio, a corporation of Ohio
Filed Sept. 22, 1959, Ser. No. 841,542
4 Claims. (Cl. 266—21)

The present invention relates to improvements in sealing means formed between the wind or suction box and the moving pallets of a continuous sintering machine of the type used in the sintering of ore concentrates, and in calcining, pellet burning, heat treating, roasting and so forth.

The invention has for its main objective the provision of a durable and wear resistant seal between the windbox of a sintering machine and the moving pallets which is effective to improve the general operation of the apparatus, and which is particularly efficient in improving the sintering operation by preventing gas or air leakage beneath the pallets when air or other gases are forced through the sinter bed.

The provision of a seal of the type described has long been an objective in the development of improved sintering machines. However, for one reason or another, nearly all of the various sealing means heretofore devised have failed to satisfy the problems encountered in the sintering operation and to attain the general objective stated above.

For example, a common seal construction includes providing the bottom of the pallets with metal wear bars or rubbing surfaces which are designed to slide along co-operating rails secured to the frame of the machine. Since the weight of the pallets rests on the rubbing surfaces, they quickly become worn and thus require frequent replacement. Because of the inherent heat and dust conditions, it has been difficult to develop an effective system of lubrication which would prolong the life of the rubbing surfaces. Another disadvantage of this construction is that excessive power is required to move the pallets because of the metal-to-metal contact of the sealing bars.

Attempts have been made to alleviate the wear problems mentioned above by supporting the pallets on rollers or wheels which ride on rails positioned on either side of the pallets, while the top of the windbox and the bottom or sides of the pallets are provided with metal-to-metal rubbing surfaces constituting the sealing means. Such a construction has been only partially successful since the rollers quickly wear causing the weight of the pallets to be again supported by the rubbing surfaces.

Other expedients known to the art have included positioning strips of asbestos or other flexible material, such as impregnated canvas between the top of the windbox and the sides of the pallets. In such arrangements, the sealing contact between the strips and pallets is easily and frequently broken or disrupted, allowing leakage of air, as the pallets shift slightly from side to side during the travel of their flanged wheels on the tracks. Further, the flexible materials heretofore used are subject to rapid deterioration by heat and friction.

Another object of the present invention is to provide an abrasion resistant and heat resistant seal between the windbox of a sintering machine and the moving pallets which is effective to prevent objectionable leakage of air.

Still another object is to provide a seal between the windbox of a sintering machine and the moving pallets which is effective to control leakage of air, and yet permits the pallets to be entirely supported on wheels thereby reducing the friction between the pallets and their supporting structure.

A further object includes the provision of a seal of the type described which is relatively inexpensive, and which can be readily and economically incorporated into existing sintering machine and pallet constructions with a minimum amount of modification.

Another object of the invention is to provide a sealing assembly including an abrasion and heat resistant sealing member having a low coefficient of friction, the sealing assembly being removably mounted on a sintering machine in such a manner that it can be readily replaced when the sealing member becomes worn.

Other objects and attendant advantages of the invention, disclosed as constituting an improvement of the existing Dwight-Lloyd type of sintering machine, will become readily apparent as the same becomes better understood when considered in connection with the following detailed description and accompanying drawings in which:

FIGURES 3 and 4 are side elevations of the sealing assemblies comprising our invention.

FIGURE 5 is a vertical section of a sealing assembly taken along the line 5—5 of FIG. 4.

FIGURE 6 is a fragmentary transverse section, showing a portion of a pallet bottom and the removably mounted sealing assembly operatively positioned on the sintering machine frame.

Figure 1:
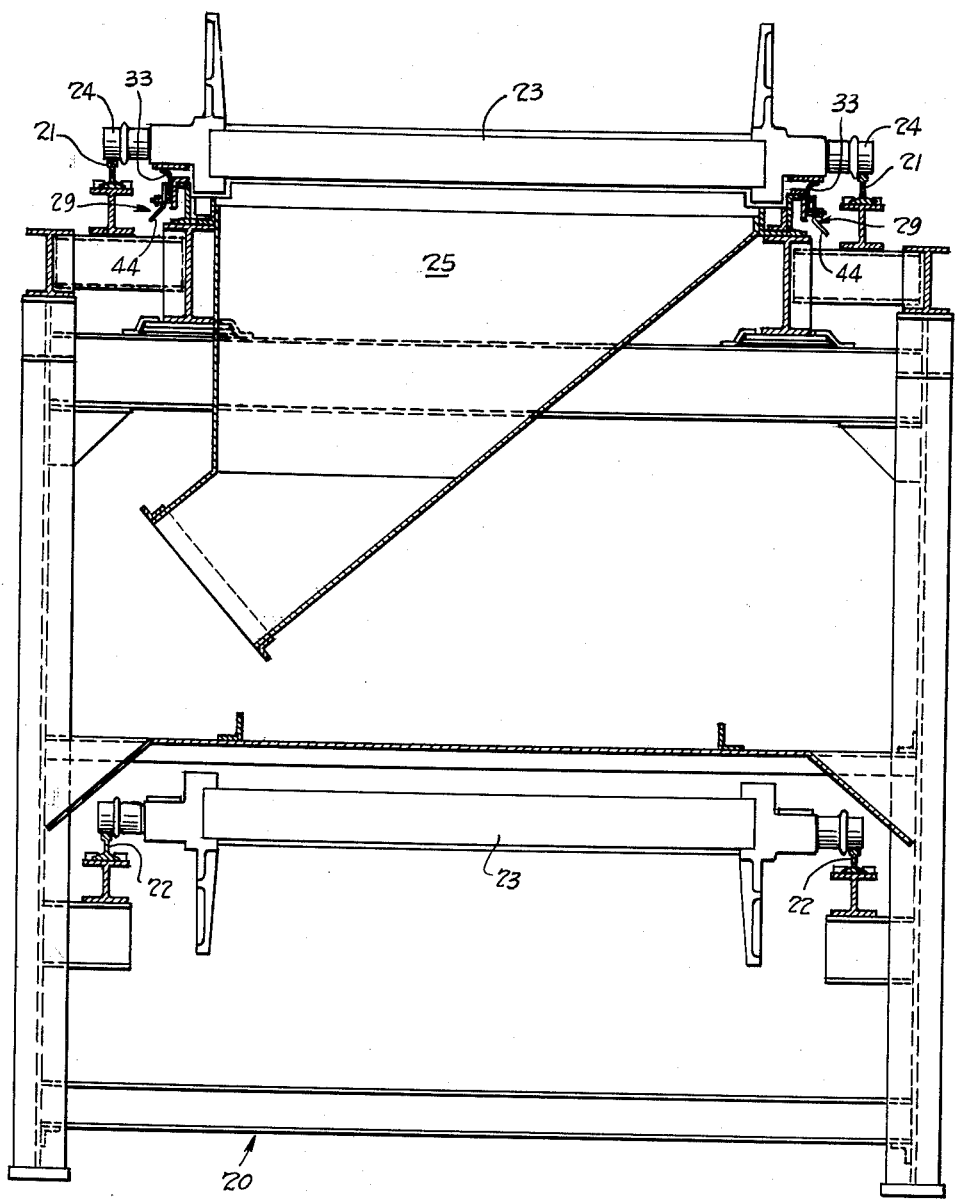
FIGURE 1 is a vertical section through a sintering machine, taken on a plane transverse to the path of the pallets, showing the pallets, trackways, a lower windbox and our sealing means between the pallets and windboxes.

Referring now to FIG. 1, the sintering machine embodying our invention is shown to include a frame 20 comprised of horizontally and vertically disposed structural members, which supports two pair of rails designated by reference numerals 21 and 22. Rails 21 define a horizontal upper track or reach along which the traveling pallets 23 are moved on their supporting wheels 24, while rails 22 constitute a return track or lower reach for the pallets. During their movement on the upper track, the pallets are charged with a sinterable material which is subsequently ignited, burned and discharged in the customary manner.

The burning of the sinterable material is promoted by means of one or more windboxes 25 supported by frame 20 within the confines of rails 21, the upper side edges of the windboxes being adjacent to and spaced from the bottoms of the supporting shoulders of the pallets. Either positive or negative air pressure created in the windboxes causes a draft of air or other gas to be forced through the sinter bed as the pallets are moved across the windbox sections.

The arrangement and function of the present invention is concerned only with the means for preventing air or gas leakage between the windboxes and pallets as will hereinafter be described in detail, and accordingly is not to be limited to the foregoing sintering machine construction which has been set forth only for the purpose that the invention may be better understood.

The general construction and arrangement of the sealing means comprising our invention will be seen in FIGS. 1 and 6 to include seal contacting surfaces, which may take the form of wear bars, on the underside of the pallets, the surfaces being located adjacent to and inward of supporting wheels 24. The bottoms of the pallet shoulders 28 and the seal contacting surfaces are spaced above the upper side edges of the windboxes in order that the weight of the pallets will be supported solely by the wheels. A sealing assembly 29 having a suitable flexible wearing strip 33 is removably fastened to the frame adjacent the upper side edges of the windboxes with the strip abutting the seal contacting surfaces to seal the space between the pallet shoulder bottoms and the windboxes.

Figure 2:
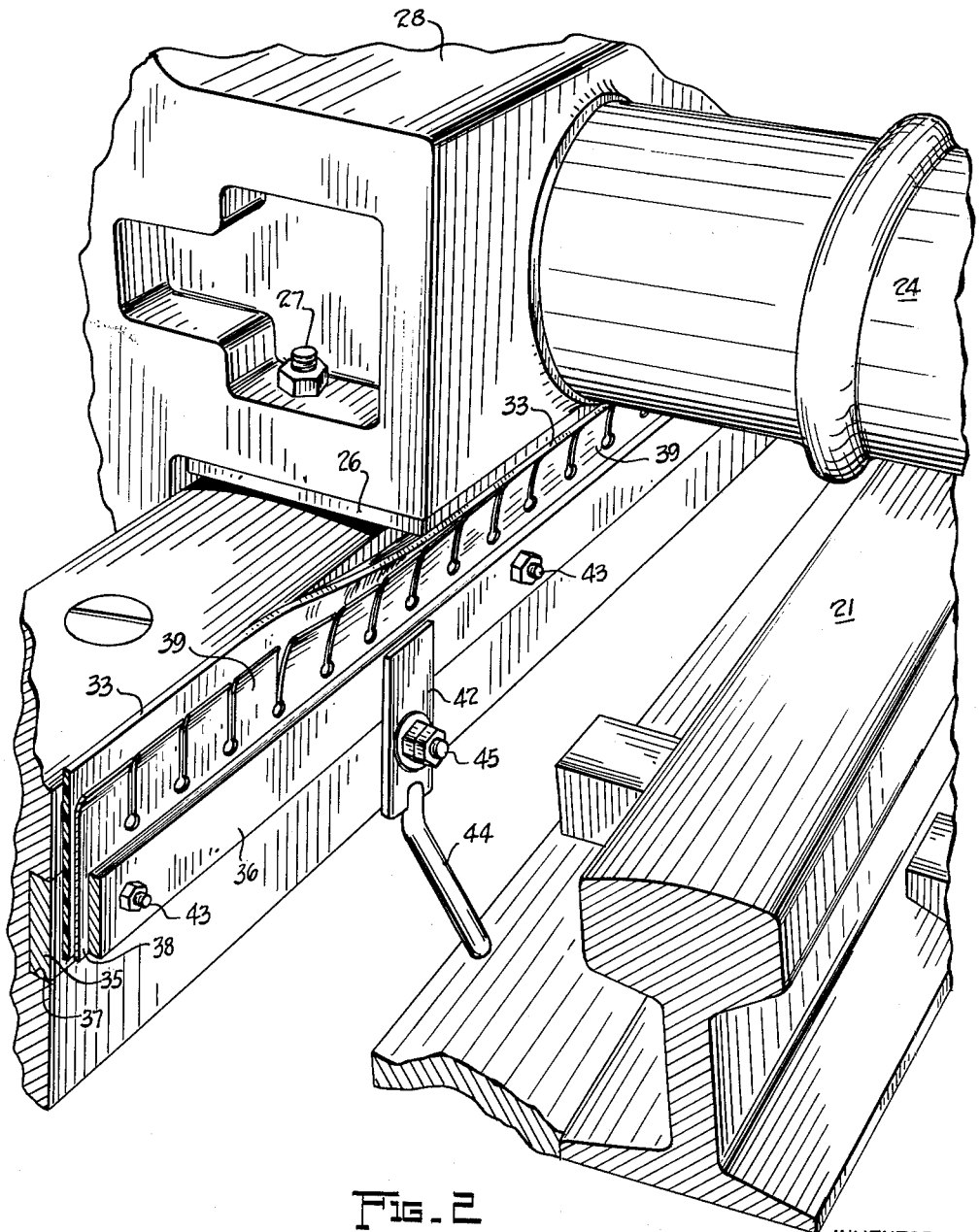
FIGURE 2 is a fragmentary perspective view of the sintering machine showing the sealing means so mounted for sealing contact with a pallet, the adjacent pallet being omitted to illustrate the sealing action.

The sealing action of the strip 33 is illustrated in FIGURE 2, wherein a portion of the strip is shown pressed into airtight, sealing contact with the bottom of the pallet shoulder 28. Another portion of the strip is shown in this figure as lying in a vertical plane, thus indicating the normal tendency of the sealing strip to press upwardly against the seal-contacting surfaces of the pallet shoulders. It is to be understood, of course, that in actual operation the pallets are moved in contacting succession so that the sealing strip is at all times in sealing contact with the pallets.

Figure 7:
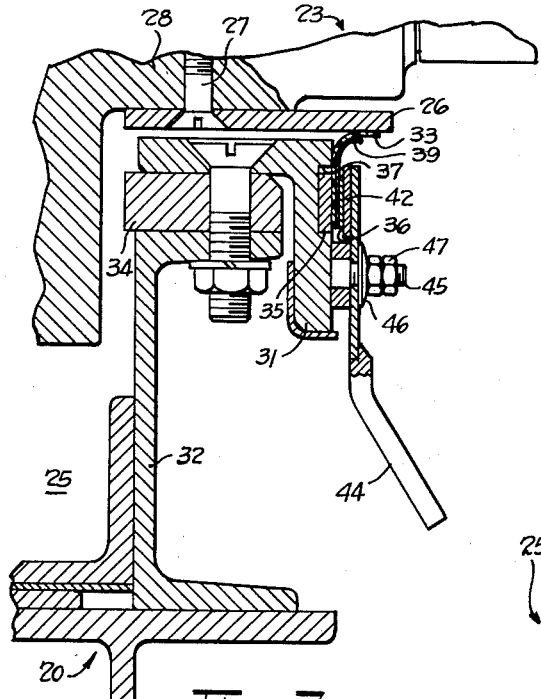
FIGURES 7 through 15 are views similar to FIG. 6 showing modified forms of the invention.
Figure 12:
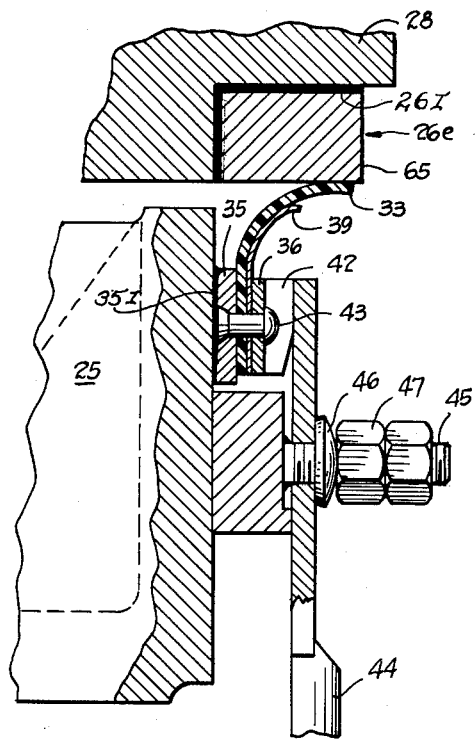

As shown in FIGS. 1 and 2, and, more particularly, in FIGS. 6 and 7, this construction may take the form of a flat wear bar 26, secured by removable fastening means, such as screws or bolts 27, to the underside of the pallet shoulders 28. The wear bars 26 may be formed from any abrasion resistant material which will not deform under the heat encountered by the pallets. An angle iron 31, fastened to a channel member 32 carried by the frame 20, serves to support a flexible sealing strip 33 in sealing contact with each wear bar, the contact being maintained during any lateral shifting of the pallets as they move along the trucks. A filler bar 34 (FIG. 7) may be inserted between members 31 and 32 in order to adjust the space between the sealing strip and the shoulder bottoms. In order to prolong the life of the wear bars, it has been found desirable in some instances to interpose insulation 26I between the wear bar and the pallet in the manner indicated in FIGS. 6 and 12. In a like manner, the sealing assembly 29 may also be insulated from the windbox by insulation 35I (FIG. 12).

In the form illustrated, each sealing strip is part of a sealing assembly 29 which includes horizontally extending clamping plates 35 and 36, plate 35 being received in a channel-shaped groove 37 formed in the side of the vertically extending leg of member 31. The assembly 29 is completed by cam plates 42 fastened in spaced intervals to the outer face of plate 36 by bolts or the like.

In normal sintering operation in which a forced draft of air is drawn down through the sinter bed by suction created in windboxes, the inherent stiffness of the sealing strip, augmented by outside air pressure, will cause the strip to press into sealing contact with the seal contacting surfaces of the pallets in the manner indicated in FIG. 6, thereby preventing air or gas leakage. The pallet-contacting edges of the strips 33 are, of course, of sufficient thickness and strength so that they will not vibrate with a reed-like action against the seal-contacting surfaces and thus permit intermittent leakage of air. When, however, the suction pressure is relatively low, it has been found necessary to reinforce the sealing strip. To this end, we prefer to include a thin strip of metal 38 having spring legs 39 between plate 36 and the outer face of the sealing strip 33. The spring legs serve to press the upper edge of strip 33 into sealing contact with the seal contacting surfaces. As will be apparent to those skilled in art, when the sintering machine is provided with a hood, and an updraft of air is forced through the bed by positive pressure in the windboxes, it is also desirable to reinforce the sealing strip with the spring means 39, which are so shaped as to press the edge of the strips 33 into substantially flat contact with the seal-contacting surfaces of the pallets.

The assembly 29 is clamped into position by means of cam levers 44 fastened to member 31 beneath the groove 37 in such a manner that a cam lever may be moved into co-operative engagement with an associated cam plate 42. Each lever is rotatably mounted on a stud 45 and is held in tight frictional engagement with the co-operating cam plate by means of a spring washer 46 and jam nuts 47.

As will be observed in FIGS. 3 and 4, the sealing assembly on both sides of the pallets is formed in a plurality of sections arranged in end-to-end relationship along the length of the machine. The ends of the sealing strips of each section are formed with beveled overlapping end portions 33a which serve to maintain the air-tight seal between the windboxes and the pallets. When because of wear or other reasons it becomes necessary to replace the sealing strips, the sectional assembly 29 may be removed from the groove 37 by simply disengaging the cam levers from the cam plates. It will be apparent that the construction is such that selected portions of the sealing assembly may be replaced without the necessity of replacing the entire structure.

Preferably, the sealing strip 33 is formed from a tough, flexible material having a low coefficient of friction and which is suitable for continuous use while subjected to temperatures of 400° F., or more, this being the approximate temperature encountered in the region of the pallet shoulders and the upper portions of the windboxes. Additionally, the material should be chemically inert since various acids, such as sulphuric acid, are often contained in the gases driven off of the sinter bed. We have found that sealing strips formed from plastic resins, as for example tetrafluoroethylene resin, satisfy all the requirements listed above, and have proved exceptionally well suited for our purposes. Strips formed from such plastic resins are tough and flexible in thin sections, and maintain their mechanical properties at temperatures up to 500° F. or more. Moreover, the material presents a slippery surface which has a very low coefficient of friction, and which initially resists adhesion of the sinter dust. As the sinter dust becomes lodged between the strip 33 and the associated seal contacting surface, the material possesses the additional property of being able to flow and coat the dust, thus, in effect, absorbing it. Consequently, a strip made from the plastic material maintains a smooth surface considerably longer than, for example, brass sealing bars in which the dust particles become embedded on the surface. Preferably, modifiers, such as glass fibers, graphite and the like, are added to the resin compound in order to reduce the rate of wear and extend the useful life of the sealing strip.

It will thus be apparent to those skilled in the art, that plastic resin strips present decided advantages over other flexible material, such as asbestos and impregnated canvas, heretofore used, which are not self-supporting and which are subject to rapid deterioration by the heat, dust, friction and gases encountered in the sintering operation.

FIGS. 8 through 15 illustrate alternative embodiments of our invention, and show how the sealing means comprising the invention can be readily and inexpensively incorporated into existing pallet and sintering machine constructions.

Figure 8:
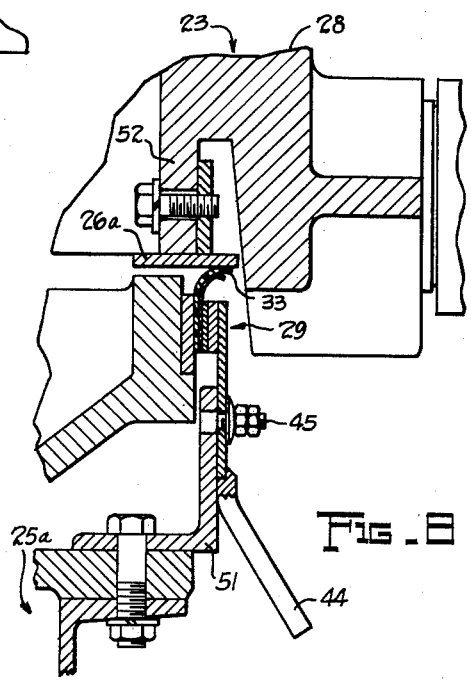

In the form shown in FIG. 8, the angle iron 51 which supports the sealing assembly 29 is bolted or otherwise secured to a laterally extending flange of the windbox 25a, while the sealing assembly is clamped against the side of the windbox. The sealing strip 33 engages a generally L-shaped wear plate 26a which is secured to the depending flange 52 of the pallets.

Figure 9:
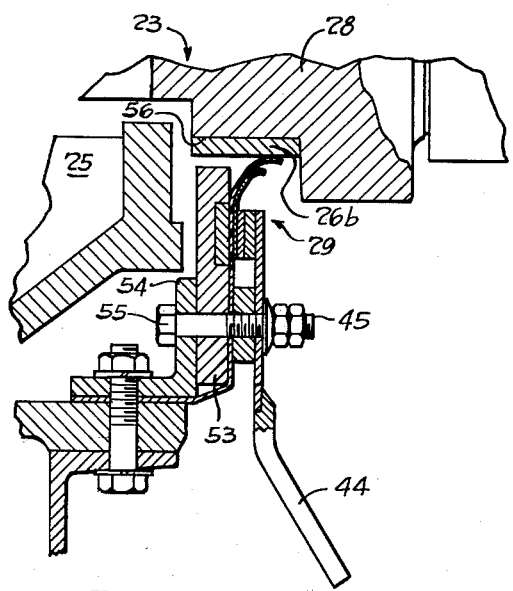
Figure 10:
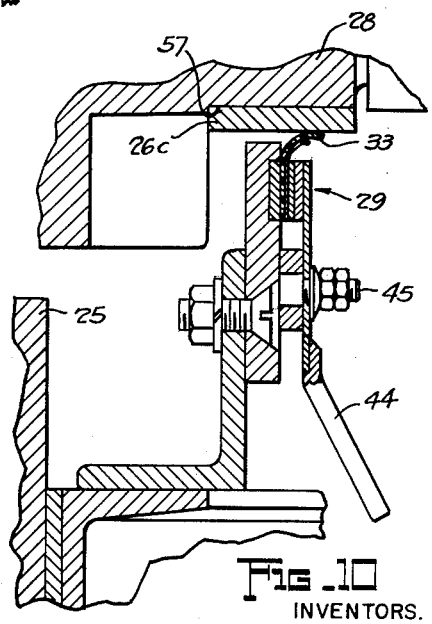

In FIG. 9, the assembly 29 and cam lever 44 are shown to be carried by a bar 53 which in turn is bolted to the angle iron 54 by bolts 55. In this modification, the seal contacting surface or wear bar 26b is in the form of a flat plate removably mounted on an inner relieved portion 56 of the pallet shoulder. The modification of FIG. 10 is similar to that shown in FIG. 9 except that the wear plate 26c is fastened to an outer relieved portion 57 of the pallet shoulder.

Figure 11:
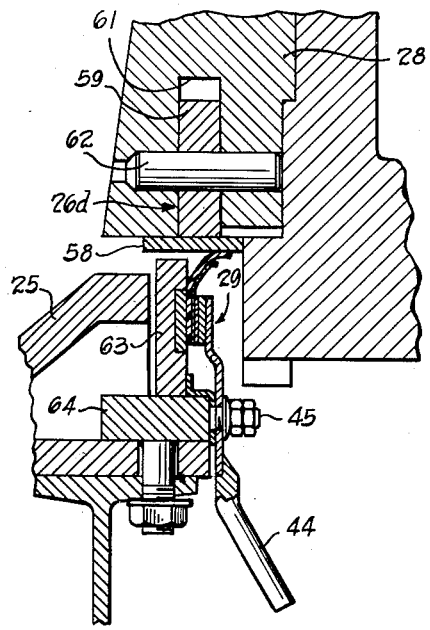

Another modification is shown in FIG. 11 in which the wear means 26d includes a seal-engaging member 58 and an apertured plate 59 welded to the upper surface of member 58 and secured within a slot 61 formed in the pallet shoulder 28. The plate 59 is removably held in the slot by means of a seal pin 62. In this instance, the sealing assembly 29 is clamped to a vertically extending bar 63 having its lower end welded to another bar 64 thereby forming a seal support of T-shaped configuration. The bar 64, which is fastened to a flange of the windbox, carries the studs 45 and the associated cam levers, spring washers and jam nuts.

In the form shown in FIG. 12, the wear means 26e is a thick bar 65 fastened to an outer portion of the pallet shoulder 28. The assembly consisting of clamping plates 35 and 36, sealing strips 33, spring strip 38 if used, and cam plate 42 is secured directly to a side of windbox 25, as is stud 45 and cam lever 44.

Figure 13:
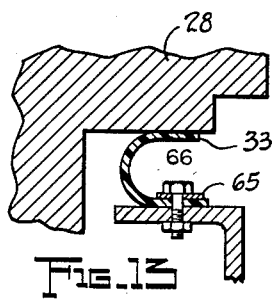
Figure 14:
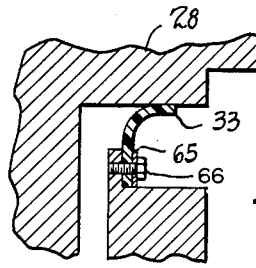

FIGS. 13 and 14 show modified structures in which the sealing strip 33 is clamped directly to a structural member of the frame by means of a plate 65 and bolts 66. In both modifications, the upper edge of the sealing strip contacts the bottom of the pallet shoulder 28 without the interposition of a wear means.

Figure 15:
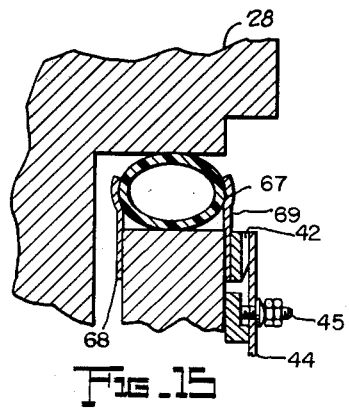

The modified structure shown in FIG. 15 utilizes an inflatable tube 67 formed of a material the same as that used in the sealing strips of the previously described structures. Tube 67, which contains internal gas or air pressure, is removably held in sealing contact with the pallet shoulder 28 by plates 68 and 69. In the form illustrated, longitudinally aligned plates 69 are removably clamped to the frame by cooperating cam plates 42 and cam levers 44 so that the tube can be readily replaced. A sealing assembly constructed in this manner is particularly useful when high positive pressures are created in the windbox.

The operation of a sintering machine embodying our invention will be largely obvious from the foregoing detailed description. In summary, the pallets are supported on wheels a short distance above the tops of the windboxes, while a tough and flexible sealing strip, preferably formed from a plastic resin, serves to seal the gap between the pallets and windboxes. When high positive pressures are created in the windboxes, a strip of metal having a series of spring fingers, as at 39 may be utilized to press the sealing strip upwardly into firm, flat contact with either the pallets or a wear bar carried by the pallets.

Obviously many modifications and variations of the present invention are possible in the light of the above teachings. It is therefore to be understood, that within the scope of the appended claims, the invention may be practiced otherwise than as specifically disclosed.

What is claimed is:

1. A sealing means for a sintering machine having a frame, a horizontal track on said frame, pallets adapted to be moved along said track in contacting succession, wheels for supporting the pallets on said track, and a windbox secured to said frame, the upper side edges of said windbox being spaced below adjacent portions of the pallet bottoms whereby the weight of the pallets rests on said wheels, said sealing means comprising a sealing strip for sealing the space between the adjacent portions of the pallet bottoms and upper side edges of the windbox, said sealing strip being formed of tetrafluoroethylene resin, said resin being characterized by high abrasion and heat resistance and by a low coefficient of friction and homogeneity, clamping plates for holding said strip in a substantially vertical plane so that it extends above and along the upper side edge of said windbox, said strip and clamping plates extending in a direction parallel to said track, a cam plate secured to one of said clamping plates, a cam lever operatively mounted on said frame, said cam lever being adapted to be turned into contact with said cam plate to releasably clamp the clamping plates and strip to said frame, and seal contacting surfaces on portions of the pallet bottoms for contacting the strip in an air-tight manner when the pallets are moved over the windbox.

2. The structure as claimed in claim 1 wherein the sealing strip and clamping plates are formed in longitudinally aligned sections.

3. The structure as claimed in claim 1 including a plurality of flat spring fingers between said sealing strip and said one of said clamping plates, said spring fingers being located in closely adjacent positions along the length of said strip and tending to press all portions of said strip toward a plane substantially parallel to said clamping plates whereby said strip is firmly pressed into sealing contact with said seal-contacting surfaces of said pallet bottoms.

4. In a sintering machine having a frame, a horizontal track on said frame, a pallets adapted to be moved along said track in contacting succession, wheels for supporting the pallets on said track, said wheels being mounted on laterally extending shoulders of the pallets, and a windbox secured to said frame, the upper side edges of said windbox being spaced below the bottoms of the pallet shoulders whereby the weight of the pallets rests on said wheels, a prefabricated, unitary sealing assembly for sealing the space between the bottoms of the pallet shoulders and the upper side edges of the windbox, said sealing assembly comprising pairs of parallel clamping plates adjacent each upper side edge of the windbox, said pairs of parallel clamping plates being formed in longitudinally aligned sections, a sealing strip between each pair of clamping plates, said sealing strip being formed of tetrafluoroethylene resin, said resin being characterized by high abrasion and heat resistance and by a low coefficient of friction and homogeneity, a cam plate fastened to one of the clamping plates in each pair, movable cam arms on said frame for cooperation with each of said cam plates, said cam arms being movable into contact with said cam plates to releasably clamp said sealing assemblies to said frame whereby any one of the longitudinally aligned sections of the assemblies may be replaced when said sealing strip is worn, and flat spring fingers positioned between said one of said clamping plates and said strip, said spring fingers being located in closely adjacent positions along the length of said strip and tending to press said strip toward substantially parallel alignment with said plates.

References Cited in the file of this patent

UNITED STATES PATENTS

| | | |
|---|---|---|
| 1,199,962 | Borson | Oct. 3, 1916 |
| 1,880,146 | Morison | Sept. 27, 1932 |
| 2,740,648 | Amblard | Apr. 3, 1956 |
| 2,853,289 | Schofield | Sept. 23, 1958 |
| 2,861,792 | Porteus et al. | Nov. 25, 1958 |
| 2,992,486 | Ruth | July 18, 1961 |

FOREIGN PATENTS

| | | |
|---|---|---|
| 222,748 | Great Britain | Oct. 9, 1924 |

OTHER REFERENCES

Du Pont Product Engineering Bulletin published by E. I. du Pont de Nemours and Co., Wilmington, Del., pp. 1–4.